Jan. 20, 1970          C. W. SARE          3,490,807

FOLD DOWN CAMPER

Filed Sept. 11, 1967          3 Sheets-Sheet 1

INVENTOR.
CLYDE W. SARE
BY
*Dunlap and Laney*
ATTORNEYS

INVENTOR.
CLYDE W. SARE
BY
Dunlap and Laney
ATTORNEYS

United States Patent Office 3,490,807
Patented Jan. 20, 1970

3,490,807
FOLD DOWN CAMPER
Clyde W. Sare, Bartlesville, Okla., assignor to Crucible Steel Company of America, Pittsburgh, Pa., a corporation of New Jersey
Filed Sept. 11, 1967, Ser. No. 666,859
Int. Cl. B60p 3/34
U.S. Cl. 296—23                                14 Claims

ABSTRACT OF THE DISCLOSURE

A portable camper vehicle adapted for towing behind a powered vehicle and including a stationary or fixed base housing, and a movable housing, pivotally secured to the base housing. The movable and base housings are relatively movable between a first position in which they are nested or telescoped one within the other to form a compact, low profile trailer, and a second, expanded position, in the attainment of which the movable housing moves upwardly and forwardly relatively to the base housing to increase the floor to ceiling distance within the camper sufficiently to accommodate tall persons standing inside the camper, and to provide facilities and sufficient space to permit a number of persons to carry on the functions of daily living inside the camper. The movement between these two positions is accomplished by a parallelogram-type mechanical linkage, and both housings are preferably of substantially right parallelepiped configuration.

BACKGROUND OF THE INVENTION

Field of the invention

This invention relates to portable dwellings, and more specifically, to portable campers of the type which can be towed in a compact status behind a powered towing vehicle, and then opened or expanded to an enlarged status so as to comfortably accommodate a plurality of persons who desire to live therein.

Description of the prior art

It has heretofore been proposed to provide portable campers in which a movable portion can be elevated, or can be expanded laterally with respect to a stationary portion to increase the total living space within the camper when it is in use, and yet permit it to occupy relatively little space and be of low height when it is transported from one location to another. Campers of this type have usually employed hydraulic or manual jacks, or an electrical system for opening or expanding the camper to its operable status, and frequently have provided less space than desirable for the accommodation of a large family when the camper is in the expanded condition.

BRIEF DESCRIPTION OF THE PRESENT INVENTION

This invention provides an expandable portable camper which, in expanding, operates through a parallelogram type linkage. Though this type of linkage has previously been used in some types of mechanical motion, it has not, to my knowledge, been used before in any portable camper vehicle, except that which is depicted in Canon U.S. Patent 3,259,422, which camper is substantially different in overall operation and use from the present invention, as will hereinafter appear. By the use of a parallelogram type linkage permitting pivotal relative movement between a stationary base housing and a movable housing, the portable camper of this invention can be more easily expanded to its operative position, and has a sufficient internal space or volume to accommodate a number of persons upon expansion to the operative position.

Broadly described, the camper of the present invention comprises a base housing having side walls and a bottom; wheels supporting said base housing; hitch means connected to the base housing; a movable housing pivotally supported on said base housing for simultaneous vertical and horizontal movement through an arc relative to said base housing, said movable housing having side walls and a top and being configured and dimensioned to nest around said base housing, with the side walls of said movable housing spaced from, and extending parallel to, the side walls of said base housing. A bunk supporting platform is pivotally secured between the side walls of the movable housing for pivotation about a horizontal axis, and can be pivoted to a horizontal position when the movable housing is elevated so that this platform then forms one level of a split-level flooring within the camper.

In a preferred embodiment of the invention, resilient biasing means is mounted on the base housing and cooperates with crank arms pivotally connected to the movable housing for biasing the movable housing upwardly and horizontally with respect to the base housing once such movement has been manually initiated. In other words, the resilient biasing means exerts a counterbalancing force which aids in elevating the movable housing to attain the expanded status of the camper. When the camper is fully expanded by moving the movable housing relative to the base housing, the side walls of the movable housing extend upwardly from the side walls of the base housing and are sealed at their lower edges with the upper edges of the side walls of the base housing.

From the foregoing description of the invention, it will be perceived that an important object of the present invention is to provide an expandible, portable camper which encloses a relatively greater volume in its expanded status than the types of expandible portable campers heretofore in use, yet is compact and low in its vertical dimension when folded down to an inoperative, transport status.

Another object of the invention is to provide a fold down, portable camper which can be manually opened to its expanded operative position, and easily folded down to a compact traveling position.

An additional object of the invention is to provide a fold down camper which provides a transverse sleeping compartment, in addition to at least two longitudinal sleeping compartments, when expanded to its operative position.

Another object of the invention is to provide an expandible portable camper which is characterized in having a rear porch when it is expanded to its opened status for occupation.

A further object of the invention is to provide a mobile camper which can be easily towed behind an automobile, and which can be relatively economically fabricated, yet is sturdy and strong in construction.

In addition to the foregoing described objects and advantages, additional objects and advantages will become apparent as the following detailed description of the invention is read in conjunction with the accompanying drawings which illustrate the invention.

DETAILED DESCRIPTION OF PREFERRED EMBODIMENTS OF THE INVENTION

In referring to the drawings, combinations of elements will be indicated by the use of reference numerals having lead lines which carry arrowheads. Individual elements will be indicated by reference numerals having plain lead lines.

Figure 1:
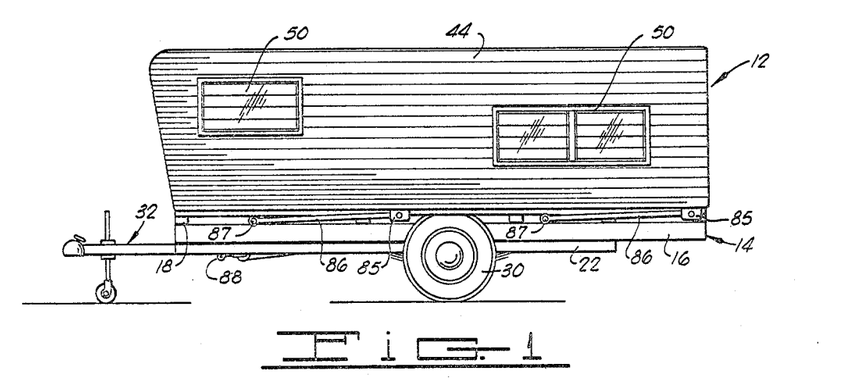
FIGURE 1 is an elevational view of a camper constructed in accordance with the present invention and showing the camper in its folded down transport status.
Figure 2:
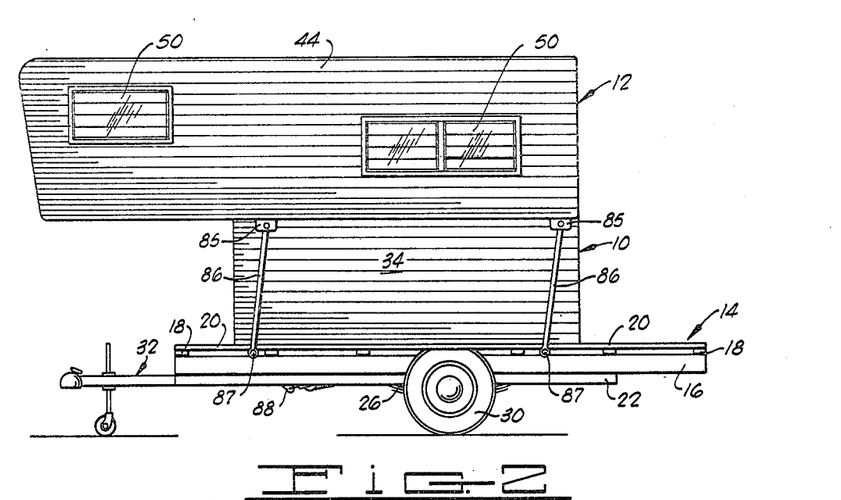
FIGURE 2 is a view in elevation of the camper depicted in FIG. 1, but showing the camper when it has been expanded to its opened position and is ready for occupancy.

Referring initially to FIGURES 1 and 2 of the drawings, the fold down camper of the invention is here illustrated in its two extreme positions of movement, with FIGURE 1 showing the camper in its folded down, traveling status, and FIGURE 2 depicting the camper in its expanded or open status ready for occupancy. The camper includes a fixed or stationary base housing 10 and a movable housing 12. In the illustrated embodiment of the invention, both the base housing 10 and the movable housing 12 are of generally right parallelepiped configuration. The base housing 10 may be said to include a supporting frame 14, which frame may be constructed in a number of ways, but which, in the illustrated embodiment, includes a pair of horizontally spaced, longitudinally extending wooden beams 16 having a plurality of transversely extending, horizontally spaced cross members 18 secured across the top thereof and supporting suitable flooring material 20. Secured to the lower side of the longitudinally extending beams 16 are a pair of angle iron members 22, and transverse brace members 24 interconnect these angle iron members at spaced points along the fore and aft axis of the frame. Suitable springs, such as the leaf springs 26, are connected to, and supported by, the angle iron members 22 and function to resiliently support an axle 28 journaling a pair of ground engaging wheels 30 on opposite ends thereof. At the forward end of the frame 14, a hitch connection designated generally by reference numeral 32 is secured to the frame and may be any suitable type of hitch connection presently provided for portable campers, house trailers or the like.

Considering in greater detail the construction of the base housing 10 and the movable housing 12, the base housing includes a pair of parallel side walls 34 which may be constructed of any suitable light weight material, and which are supported by, and secured to, the flooring material 20 at their lower edges. A rear wall 36 extends transversely across the camper between the side walls 34 of the base housing, and is partially cut out to provide a space for the accommodation of the lower portion 38a of a Dutch door as more fully hereinafter explained. A forward wall 40 is provided at the forward end of the base housing 10 and extends transversely across the camper and parallel to the rear wall 36. It may be noted in passing that in the illustrated embodiment, there are also provided on the interior of the base housing 10, a pair of wheel wells 42 which receive the upper portion of the ground engaging wheels 30. When the interior of the camper is finished and furnished in a manner not depicted in the drawings, these wheel wells 42 may be used to support seats, bunks or other structures utilized by the occupants of the camper.

The movable housing 12 of the fold down camper of the invention includes a pair of longitudinally extending, parallel side walls 44 which are connected at their rear edges to a transversely extending rear wall 46, and at their forward edges to a vertically extending inclined forward wall 48. The rear wall 46 of the movable housing 12 is cut away to provide a space for the accommodation of the upper portion 38b of a Dutch door, and the side walls 44 are apertured to accommodate jalousy-type windows 50. A jalousy-type window 52 is also provided in the forward wall 48. Extending across the top of the movable housing 12 between the side walls 44, and between the rear wall 46 and the forward wall 48 is a suitable weather-proof roof 54.

Figure 5:
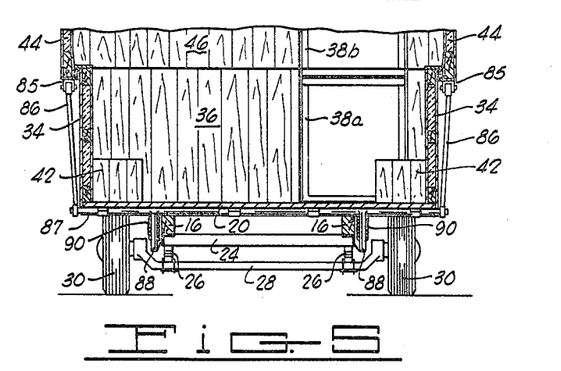
FIGURE 5 is a vertical sectional view taken along line 5—5 of FIG. 4.
Figure 6:
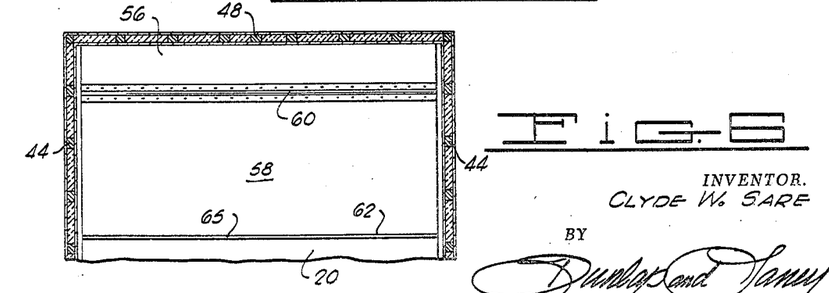
FIGURE 6 is a detail sectional view taken along line 6—6 of FIG. 5.

A transverse flooring element 56 extends between the side walls 44 of the movable housing 12 in the extreme forward portion of the movable housing, and is connected at its forward edge to the lower edge of the forward wall 48 of the movable housing. A bunk supporting platform 58 extends transversely between the side walls 44 of the movable housing 12 at a position which is to the rear of the transverse flooring member 56, and the bunk supporting platform 58 is pivotally connected at its forward edge to the transverse flooring member 56 by a suitable hinge 60 as depicted in FIGURES 5 and 6. The bunk supporting platform 58 is of a dimension as measured from front to rear of the camper such that its rear edge 62 will be flush or even with the internal surface of the front wall 40 of the base housing 10 when the camper is expanded to its opened position and the bunk supporting platform 58 is pivoted downwardly to the horizontal position depicted in FIGURE 5. For the purpose of retaining the bunk supporting platform 58 in this horizontal position, and preventing accidental collapse of the camper to its compact traveling position, a notch 63 is cut in the forward edge of the platform 58 and cooperates with a mating notch 64 provided in the upper edge of the front wall 40 of the base housing 10. A flange 65 extends downwardly from the rear edge of the bunk supporting platform 58 to complete the interlock (see FIG. 7c). A suitable handhold (not shown) is provided on the bunk platform 58 so that it may be disengaged from the wall 40 when it is desired to fold the camper downwardly to its compact traveling status as will be more fully hereinafter explained.

Figure 3:
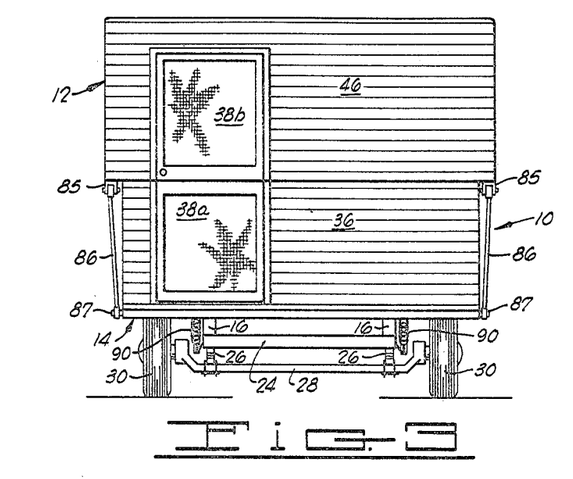
FIGURE 3 is a view in elevation of the rear of the camper as it appears when expanded to its opened position ready for occupancy.
Figure 4:
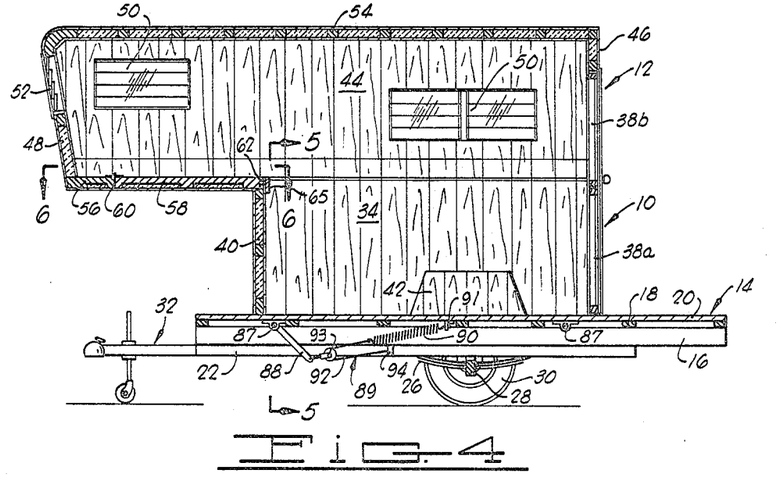
FIGURE 4 is a vertical, sectional view taken through the camper in a plane extending just inside one of the wheels of the camper.

It will be noted in referring to FIGURES 3 and 4 that the forward wall 48 and rear wall 46 of the movable housing 12 are wider in their transverse dimensions than are the forward wall 40 and rear wall 36 of the base housing 10. It will further be noted that the distance between the forward and rear walls 48 and 46, respectively, of the movable housing 12 is considerably greater than the distance which separates the forward and rear walls 40 and 36, respectively, of the base housing 10. This difference in the dimensions of the base housing 10 and the movable housing 12 permits the base housing 10 to be nested within the movable housing 12 at such time as the camper is folded down to its compact transport status as depicted in FIGURE 1.

Figure 7A:
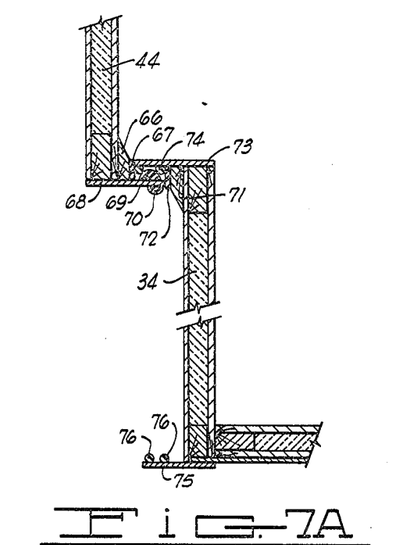
FIGURES 7a–7c are detail sectional views of certain sealing elements utilized between the two housings constituting major subassemblies of the invention.

Prior to describing the structure which permits the movable housing 12 to be elevated to achieve the expanded status of the camper depicted in FIGURES 2–5, it should be pointed out that a weather-tight sealing structure is provided for preventing blowing rain, cold air, dust or other deleterious materials from entering the camper by passage between the walls of the movable housing 12 and the walls of the base housing 10. Thus, as depicted in FIGURE 7a, the side walls 44 of the movable housing 12 carry at their lower edges, a tapered guide member 66 to which is secured a resilient pad 67. An inwardly extending flange 68 is also secured to each side wall 44 of the movable housing 12 and carries relatively large sealing beads 69 and 70 of resilient material on its upper and lower surfaces, respectively. For the purpose of permitting a seal to be developed between the side walls 34 of the base housing 10 and the side wall 44 of the movable housing 12, each side wall of the base housing carries at its upper edge a tapered guide member 71 to which is secured a resilient pad 72. An outwardly extending flange 73 is also secured to each side wall 34 of the base housing 10 et al. at the upper edge thereof and carries a pair of downwardly facing, horizontally spaced, beads 74. At the lower edge of each side wall 34, an outwardly extending flange 75 is provided and carries a pair of upwardly facing, horizontally spaced resilient sealing beads 76.

When the camper is expanded to its opened position, the large sealing bead 69 carried on the upper surface of the flange 68 is guided by the guide member 71 into sealing contact with the beads 74, thus precluding the entrance of cold air, blowing rain or dust to the interior of the camper. Substantially the same sealing action occurs upon folding the camper down to its compact travelling status, at which time sealing bead 70 on the lower side of the flange 68 mates with the sealing beads 76 on the upper side of the flange 75.

Figure 7B:
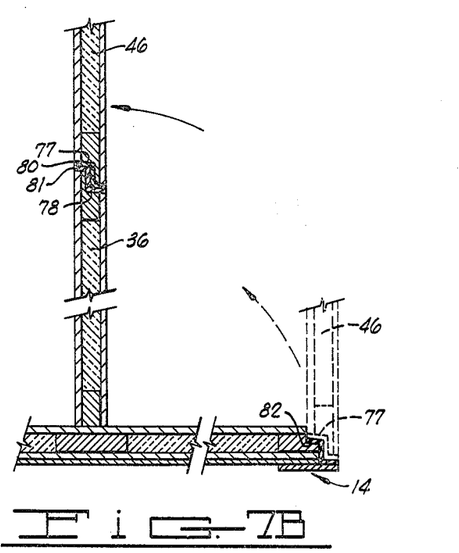

It is also necessary to provide structure for forming a seal between the lower edge of the rear wall 46 of the movable housing 12 and the upper edge of the rear wall 36 of the base house 10 when the camper is in its expanded status. This structure is depicted in FIGURE 7b of the drawings, and includes an angular channel 77 formed in the lower edge of rear wall 46, and a complementary or mating channel 78 formed in the upper edge of the rear wall. Both of the channels 77 and 78 are faced with resilient sealing pads 80 and 81, respectively, which bear against each other when the walls 36 and 46 are vertically aligned to form a weather-tight seal between the walls. A similar sealing-pad faced channel 82 is formed in the rear edge of the frame 14 for sealingly engaging the lower edge of the wall 46 of the movable housing 12 when the camper is folded down.

Figure 7C:
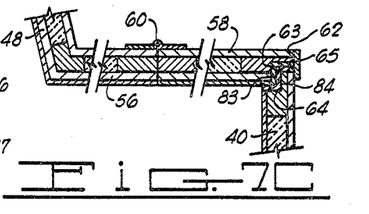

It will be noted in referring to FIGURE 7c that a seal is provided between the front or forward wall 40 of the base housing 10 and the bunk supporting platform 58 when the camper is expanded and the bunk supporting platform is folded down to its horizontal position. The seal is formed by a pair of cooperating sealing pads 83 and 84 which face the notches 63 and 64, respectively.

For the purpose of permitting the movable housing 12 to be moved through an arc from its nested or compact position relative to the base section 10 as depicted in FIGURE 1, to its expanded or opened position as depicted in FIGURES 2 and 3, a parallelogram-type linkage is provided, and includes a pair of horizontally spaced brackets 85 secured to the lower edge of each of the opposed side walls 44 of the movable housing 12 of the camper. The brackets 85 each journal the upper end of a pivot arm 86, and the lower ends of these pivot arms are secured or keyed to transversely extending shafts 87 which are secured to, and supported by, the longitudinal beams 16. The forward shaft 87 is pivotally supported on the beams 16 and constitutes a portion of a crank arm assembly which includes, in addition to the forward shaft 87, a pair of downwardly extending arms 88 which are rigidly secured to the shaft 87 for pivotal movement therewith. The arms 88 are located on the outside of the pair of longitudinally extending beams 16 as depicted in FIGURES 4 and 5.

Resilient biasing means utilized for assisting the upward and forward movement of the movable housing 12 to attain the expanded status of the camper is designated generally by reference numeral 89 and is best depicted in FIGURES 4 and 5. In the embodiment of the invention illustrated in these figures, each resilient biasing means includes an elongated helical spring 90 which has one of its ends connected to a suitable retaining backet 91, and which has its other end connected to one end of an elongated flexible cable 92. The cable 92 is extended around a sheave or pulley 93 which is connected closely to the lower end of one of the arms 82. A second end of the flexible cable 92 is attached to a suitable bracket 94 which may be welded or otherwise suitably secured to the outside of one of the angle irons 22.

OPERATION OF THE DESCRIBED EMBODIMENT

At such time as the fold down camper of the present invention is hitched to a powered vehicle, such as an automobile, by the use of the hitch assembly 32, the camper may be folded down to a compact, traveling status as depicted in FIGURE 1. In this status, the movable housing 12 telescopes over, or nests with, the base housing 10 so that the folded down camper has a low profile and presents no problem in passing under low vertical clearances which may be encountered on the highway. Moreover, the wind resistance offered by the compact camper in its traveling status is low, so that it offers minimum resistance to pulling at relatively high speeds.

After the location is reached at which it may be desired to stop and camp, or at least live for a period of time within the camper of the invention, the movable housing 12 is caused to move upwardly and forwardly through an arc from the fold down, compact position depicted in FIGURE 1, to the expanded or opened position depicted in FIGURE 2. The expanding movement of the camper may be instituted by manually lifting upwardly on the movable housing 12, using any suitable type of hand holds for this purpose. The resilient biasing means 89 is constructed and arranged in such a way that prior to the time that the movable housing 12 begins to move upwardly and forwardly, the springs 90 are in maximum tension. As the movable housing 12 moves upwardly and forwardly under manual impetus, the arms 88 pivot with the shaft 87 in a counterclockwise direction as viewed in FIGURES 1, 2 and 4, and the helical springs 90 assist in this movement due to tension acquired when the camper is in its folded down or compact status. It will be perceived that the manner in which the movable housing 12 moves with respect to the base housing 10 is through an arc in which the initial increment of movement has a more pronounced vertical component than horizontal component. Soon, however, these components become equal, and then the horizontal component of movement becomes substantially greater than the vertical component. As the horizontal component of movement increases relative to the vertical component, less effort is required to expand the camper. In the last portion of the forward movement of the movable housing 12, most of the tension has been removed from the springs 90 so that they exert little effect in moving the movable housing 12 forward, but this forward movement can be accomplished by a relatively small manually applied force since the movable and base housings are each constructed of relatively lightweight materials.

As the movable housing 12 arrives at its final expanded or open position as depicted in FIGURE 2, the various sealing bead or pads hereinbefore described as located in the housing move into cooperating contact with the sealing beads or pads carried at the upper edges of the walls of the base housing 10, and establish a weathertight seal therewith. Simultaneously, the bunk supporting platform 58 pivots downwardly under the influence of gravity, and assumes the horizontal position depicted in FIGURES 4 and 6. Also, the upper and lower portions 38b and 38a of the Dutch door mate with each other as depicted in FIGURES 4 and 5, and thus may be used either individually, or may be joined together by a suitable connecting means to form a full length door opening at the rear of the expanded camper onto a porch formed by the exposed portion of the flooring material 20 at the rear portion of the frame 14. When the camper has been expanded, it is retained in this position by the mating interlock which is formed between the lower surface of the bunk supporting platform and the upper edge of the front wall 40 of the base housing 10. This interlock prevents the movable housing 12 from moving to the rear and downwardly as is required to fold the camper downwardly to its compact status. The interconnection between the two portions of the Dutch door also prevents such downward folding of the two housings.

At such time as it may be desired to fold the camper downwardly to its transport position, the bunk platform 58 is pivoted upwardly slightly by the use of any type of suitable hand hold to release the interlock between this platform and the wall 40, and the Dutch door portions 38a and 38b, if engaged, are released from each other. The movement of the movable housing 12 during the initial increment of its fold down motion disengages the seals between this housing and the base housing 10, and carries the disengaged rear edge of the bunk platform 58 past the upper edge of the forward wall 40 of the base housing 10. The movable housing 12 then moves downwardly and rearwardly, simultaneously, through the arc heretofore described. As it undergoes this movement, the upper edge of the forward wall 40 of the base housing 10 bears against the lower side of the bunk platform 58 causing it to pivot upwardly about its hinge 60. Concurrently, as the movable housing 12 moves downwardly and rearwardly, the helical springs 90 are placed in tension by the forward movement of the lower end of the arms 88. Thus, the springs 90 assist in preventing too rapid a downward movement by the movable housing 12, and permit this movement to be completed gently with a minimum amount of acquired manual opposition to the downward movement of the movable housing. When the downward and rearward movement of the movable housing 12 is completed, the bunk platform 58 is folded to a vertical position and defines a compartment with the forward wall 48 of the movable housing 12 for accommodating a mattress and other gear. A compartment is also established between the rear walls 36 and 46 of the base housing 10 and the movable housing 12, respectively.

Figure 8:
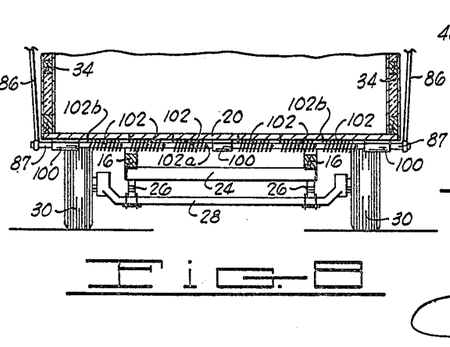
FIGURE 8 is a partial sectional view similar to a portion of the sectional view shown in FIG. 4, but illustrating a modified embodiment of the spring system utilized to assist in expanding the camper to its opened status.

A different embodiment of resilient biasing means which may be used to assist in the expansion of the camper to its open status is depicted in FIGURE 8. Here reference numerals have been used to designate structural elements which are identical to structural elements appearing in the figures of the drawings hereinbefore described. The shafts 87 thus extend through suitable brackets 100 mounted beneath the floor of the trailer, and pivot during the expansion of the camper in the manner hereinbefore described. Instead of using the coil spring, cable and pulley arrangement depicted in FIGURE 4, however, torsion springs 102 are utilized in the FIGURE 8 embodiment for assisting in the upward and forward movement of the movable housing 12. The torsion springs 102 are coiled around the shaft 87, and each have one end 102a secured in this shaft and the other end 102b secured to the flooring of the base housing 10 of the camper. Thus, as the shaft 87 is rotated about its longitudinal axis during the lowering of fold down movement of the movable housing 12, the torsion springs 102 are placed in tension and remain in tension until such time as the camper is again expanded to its open position. Upon such expanding movement of the movable housing 12, the tension in the springs 102 assists in this upward and forward movement of the movable housing.

From the foregoing description of the invention, it will have become apparent that the present invention provides an improved portable camper structure which can be easily expanded to increase its total internal volume, and thus permit it to accommodate a number of persons. The camper is of simple and relatively economic construction, can be easily maintained, and is characterized in having a long and trouble-free operating life.

Although certain preferred embodiments of the invention have been herein described as illustrative of ways in which the fold down camper of the invention can be constructed, it is to be understood that various changes and innovations can be effected in this structure and the depicted embodiments without departure from the basic principles which underlie the invention. All changes and modifications of this type are therefore deemed to be circumscribed by the spirit and scope of the invention except as the same may be necessarily limited by the appended claims or reasonable equivalents thereof.

What is claimed is:

1. A fold down portable camper comprising:
a base housing having side walls and a bottom;
wheels supporting said base housing;
hitch means connected to said base housing; and
a movable housing pivotally supported on said base housing for simultaneous vertical and horizontal movement through an arc relative to said base housing, said movable housing having side walls and a roof, and being configured and dimensioned to nest around said base housing with the side walls of said movable housing spaced from, and extending parallel to, the side walls of side base housing, said roof extending across and covering said base housing; and
a bunk supporting platform pivotally secured between the side walls of said movable housing for pivotation about a horizontal axis extending between said side walls to a substantially horizontal position when said movable housing is elevated to its maximum height in relation to said base housing, said bunk supporting platform engaging and being supported by said base housing in its horizontal position.

2. A fold down portable camper comprising:
a base housing having side walls and a bottom;
wheels supporting said base housing;
a movable housing pivotally supported on said base housing for simultaneous vertical and horizontal movement through an arc relative to said base housing, said movable housing having side walls and a roof, and being configured and dimensioned to nest around said base housing with the side walls of said movable housing spaced from, and extending parallel to, the side walls of said base housing, and said roof extending across and covering said base housing; and
a parallelogram type linkage supporting said movable housing on said base housing and retaining the roof of said movable housing substantially parallel to the bottom of said base housing during relative movement between the two housings, said linkage restricting movement of said movable housing to a path of travel wherein the lower edges of the side walls of said movable housing become substantially aligned with the upper edges of the side walls of said base housing.

3. A fold down portable camper comprising:
a base housing having side walls, a front wall, a rear wall, and flooring extending horizontally beyond said rear wall,
wheels supporting said base housing;
hitch means connected to the base housing; and
a movable housing pivotally supported on said base housing for simultaneous vertical and horizontal movement through an arc relative to said base housing, said movable housing having side walls and a roof, and being configured and dimensioned to nest around said base housing with the side walls of said movable housing spaced from, and extending parallel to, the side walls of said base housing, and said roof extending across and covering said base housing, that portion of said flooring which extends beyond the rear wall of said base housing partially supporting said movable housing when said movable housing is nested around said base housing, and forming a porch when said movable housing is moved upwardly to the end of said arc relative to said base housing.

4. A fold down portable camper comprising:
a base housing having side walls and a bottom;
wheels supporting said base housing;
hitch means connected to the base housing;
a movable housing pivotally supported on said base housing for simultaneous vertical and horizontal movement through an arc relative to said base housing, said movable housing having side walls and a roof, and being configured and dimensioned to nest around said base housing with the side walls of said movable housing spaced from, and extending parallel to, the side walls of said base housing, and said roof extending across and covering said base housing:
a bunk supporting platform pivotally secured between the side walls of said movable housing for pivotation about a horizontal axis to a substantially horizontal position when said movable housing is elevated to its maximum height in relation to said base housing; and
means cooperating with said bunk supporting platform to lock said movable housing against movement relative to said base housing.

5. A fold down portable camper comprising:
a base housing having side walls and a bottom;
wheels supporting said base housing;
hitch means connected to the base housing; and
a movable housing pivotally supported on said base housing for simultaneous vertical and horizontal movement through an arc relative to said base housing, said movable housing having side walls and a roof, and being configured and dimensioned to nest around said base housing with the side walls of said movable housing spaced from, and extending parallel to, the side walls of said base housing, and said roof extending across and covering said base housing;
a pair of substantially parallel pivot arms of substantially equal length on opposite sides of the base housing and movable housing, said pivot arms each being connected at an upper end to said movable housing;
a pair of substantially parallel, horizontal shafts pivotally secured to said base housing and extending transversely thereof, each of said shafts being secured at its opposite ends to two of said pivot arms located on opposite sides of said camper, said shafts extending parallel to two parallel imaginary lines extending transversely across the camper between the points of connection to said movable housing of the upper ends of said pivot arms;
at least one downwardly extending arm on one of said shafts and positioned on said one shaft for movement from a first position of inclination to a vertical plane, through said vertical plane, to a second position of inclination to said vertical plane; and
a spring operatively connected to said downwardly extending arm and to said base housing for tensioning when said one shaft is rotated about its longitudinal axis to move said arm from said first position to said second position.

6. A fold down portable camper comprising:
a base housing having side walls and a bottom;
wheels supporting said base housing;
hitch means connected to the base housing;
a movable housing pivotally supported on said base housing for simultaneous vertical and horizontal movement through an arc relative to said base housing, said movable housing having side walls and a roof, and being configured and dimensioned to nest around said base housing with the side walls of said movable housing spaced from, and extending parallel to, the side walls of said base housing, and said roof extending across and covering said base housing;
a pair of substantially parallel pivot arms of substantially equal length on opposite sides of the base housing and movable housing, said pivot arms each being connected at an upper end to said movable housing;
a pair of substantially parallel, horizontal shafts pivotally secured to said base housing and extending transversely thereof, each of said shafts being secured at its opposite ends to two of said pivot arms located on opposite sides of said camper, said shafts extending parallel to two parallel imaginary lines extending transversely across the camper between the points of connection to said movable housing of the upper ends of said pivot arms; and
torsion spring means engaging at least one of said shafts and placed in tension by rotation of said one shaft in one direction.

7. A fold down portable camper comprising:
a base housing having side walls and a bottom;
wheels supporting said base housing;
hitch means connected to the base housing; and
a movable housing pivotally supported on said base housing for simultaneous vertical and horizontal movement through an arc relative to said base housing, said movable housing having side walls and a roof, and being configured and dimensioned to nest around said base housing with the side walls of said movable housing spaced from, and extending parallel to, the side walls of said base housing, and said roof extending across and covering said base housing, said base housing and movable housing both being of substantially right parallelepiped configuration and said movable housing being movable from a first position in which it is nested around said base housing to a second position at one end of said arc in which the lower edges of the side walls of said movable housing are aligned with the upper edges of the side walls of said base housing, and a portion of said movable housing overhangs said base housing.

8. An expandible, mobile camper comprising:
a substantially horizontally extending framework;
ground engaging wheels secured beneath and supporting said framework;
a base housing secured to the upper side of said framework and including side walls, a front wall, and a back wall;
a movable housing resting on said framework and enclosing said base housing, said movable housing having side walls extending substantially parallel to the side walls of the base housing, and having a front wall and a back wall extending parallel to the front and back walls, respectively, of the base housing, and said movable housing further having a roof extending between the side walls thereof and over said base housing;
a transverse flooring element extending horizontally between, and secured to, the lower edges of the side walls and front wall of the movable housing;
a bunk supporting platform extending between the side walls of the movable housing and pivotally secured along one of its edges to a transversely extending edge of said transverse flooring element, said platform being pivoted from a vertically extending position to a position of coplanar alignment with said transverse flooring element;
two pairs of parallel pivot arms of substantially equal length pivotally secured between said movable housing and said base housing to permit said movable housing to move simultaneously upwardly and forwardly relative to said base housing while retaining said roof substantially horizontal; and
resilient biasing means mounted on said framework and applying an upward force to said movable housing tending to move said movable housing vertically with respect to said base housing.

10. An expandible, mobile camper comprising:
a substantially horizontally extending framework;
ground engaging wheels secured beneath and supporting said framework;
a base housing secured to the upper side of said framework and including side walls, a front wall, and a back wall;
first door means in the back wall of said base housing;
a movable housing resting on said framework and enclosing said base housing, said movable housing having side walls extending substantially parallel to the side walls of the base housing, and having a front wall and a back wall extending parallel to the front and back walls, respectively, of the base housing, and said movable housing further having a roof extending between its side walls over said base housing;
second door means in the back wall of said movable housing, said second door means being horizontally aligned with said first door means and forming therewith a Dutch door when said movable housing is moved to a position in which the lower edges of its side walls are substantially horizontally aligned with the upper edges of the side walls of said base housing;
two pairs of parallel pivot arms of substantially equal length pivotally secured between said movable housing and said base housing to permit said movable housing to move simultaneously upwardly and forwardly relative to said base housing while retaining said roof substantially horizontal; and
resilient biasing means mounted on said framework and applying an upward force to said movable housing tending to move said movable housing vertically with respect to said base housing.

11. An expandible, mobile camper comprising:
a base housing including side walls, a front wall and a back wall;
a movable housing enclosing said base housing, said movable housing having side walls extending substantially parallel to the side walls of the base housing and having a front wall and a back wall extending parallel to the front and back walls, respectively, of the base housing, and said movable housing further having a roof extending between its side walls over said base housing;
two pairs of parallel pivot arms of substantially equal length pivotally secured between said movable housing and said base housing to permit said movable housing to move simultaneously upwardly and forwardly relative to said base housing while retaining said roof substantialy horizontal;
a substantially horizontally extending framework secured beneath said base housing and extending horizontally on opposite sides of the back wall of said base housing to provide internal flooring in said base housing and a rear porch outside said base housing, and wherein said rear porch is enclosed by said movable housing when said movable housing rests upon said framework and encloses said base housing; and
resilient biasing means mounted on said framework and applying an upward force to said movable housing tending to move said movable housing vertically with respect to said base housing.

12. An expandible, mobile camper comprising:
a substantially horizontally extending framework;
ground engaging wheels secured beneath and supporting said framework;
a base housing secured to the upper side of said framework and including side walls, a front wall, and a back wall;
a movable housing resting upon said framework and enclosing said base housing, said movable housing having side walls extending substantially parallel to the side walls of the base housing, and having a front wall and a back wall extending parallel to the front and back walls, respectively, of the base housing, and said movable housing further having a roof extending between its side walls over said base housing;
two pairs of parallel pivot arms of substantially equal length pivotally secured between said movable housing and said base housing to permit said movable housing to move simultaneously upwardly and forwardly relative to said base housing while retaining said roof substantialy horizontal;
resilient biasing means mounted on said framework and applying an upward force to said movable housing tending to move said movable housing vertically with respect to said base housing, said resilient biasing means including:
crank arms interconnecting said framework and movable housing; and
torsion springs resiliently biasing said crank arms in a direction to lift said movable housing upwardly and forwardly relative to said base housing.

13. A fold down portable camper comprising:
a base housing having side walls and a bottom;
wheels supporting said base housing; and
a movable housing pivotally supported on said base housing for simultaneous vertical and horizontal movement through an arc relative to said base housing, said movable housing having side walls and a roof, and being configured and dimensioned to nest around said base housing wtih the side walls of said movable housing spaced from the side walls of said base housing, and said roof extending across and covering said base housing, said movable housing being movable from a first position in which it is nested around said base housing to a second position at one end of said arc in which the lower edges of the side walls of said movable housing are aligned with the upper edges of the side walls of said base housing.

14. An expandible, mobile camper comprising:
a substantially horizontally extending framework;
a base housing secured to the upper side of said framework and including side walls, a front wall, and a back wall;
first door means in the back wall of said base housing;
a movable housing resting upon said framework and enclosing said base housing, said movable housing having side walls spaced from the side walls of the base housing, and having a front wall and a back wall extending generally parallel to the front and back walls, respectively, of the base housing, said movable housing further having a roof extending between its side walls and over said base housing;
second door means in the back wall of said movable housing, said second door means being horizontally aligned with said first door means and forming therewith a Dutch door when said movable housing is moved to a position in which the lower edges of its side walls are substantially aligned with the upper edges of the side walls of said base housing;
means secured between said movable housing and said base housing to permit said movable housing to move simultaneously upwardly and forwardly relative to said base housing while retaining said roof substantially horizontal; and
resilient biasing means connected to said means secured between said movable housing and said base housing and applying an upward force to said movable housing tending to move said movable housing vertically with respect to said base housing.

(References on following page)

References Cited

UNITED STATES PATENTS

| | | | |
|---|---|---|---|
| 3,397,007 | 8/1968 | Scheid | 296—27 |
| 3,168,343 | 2/1965 | Marcel | 296—27 |
| 3,259,422 | 7/1966 | Canon | 296—23 |
| 2,193,352 | 3/1940 | Thomas | 296—23.3 |

PHILIP GOODMAN, Primary Examiner

U.S. Cl. X.R.

52—64

UNITED STATES PATENT OFFICE

CERTIFICATE OF CORRECTION

Patent No. 3,490,807　　　　　　　　　　　　　　　January 20, 19

Clyde W. Sare

It is certified that error appears in the above identified patent and that said Letters Patent are hereby corrected as shown below:

In the heading to the printed specification, lines 3 to "Clyde W. Sare, Bartlesville, Okla., assignor to Crucible Steel Company of America, Pittsburgh, Pa., a corporation of New Jersey" should read -- Clyde W. Sare, P. O. Box 3233, Bartlesville, Okla. 74003 --.

Signed and sealed this 31st day of March 1970.

(SEAL)
Attest:

Edward M. Fletcher, Jr.　　　　　　　　　　　　WILLIAM E. SCHUYLER, JI
Attesting Officer　　　　　　　　　　　　　　　　　Commissioner of Patents